(12) United States Patent
Fessler (10) Patent No.: US 6,666,320 B1
(45) Date of Patent: Dec. 23, 2003

(54) APPARATUS AND A METHOD FOR HANDLING CONFECTIONERY PRODUCTS

(75) Inventor: Martin Fessler, Skovby (DK)

(73) Assignee: Gram A/S (DK)

( * ) Notice: Subject to any disclaimer, the term of this patent is extended or adjusted under 35 U.S.C. 154(b) by 0 days.

(21) Appl. No.: 09/807,134

(22) PCT Filed: Oct. 7, 1999

(86) PCT No.: PCT/DK99/00529

§ 371 (c)(1),
(2), (4) Date: Apr. 9, 2001

(87) PCT Pub. No.: WO00/19838

PCT Pub. Date: Apr. 13, 2000

(30) Foreign Application Priority Data

Oct. 7, 1998 (DK) .......................................... 1998 01277

(51) Int. Cl.[7] .............................................. B65G 49/02
(52) U.S. Cl. .................................. 198/346.3; 198/465.4
(58) Field of Search ........................... 198/346.3, 465.1, 198/465.4, 346.2, 678.1, 680, 687.1; 99/404, 420

(56) References Cited

U.S. PATENT DOCUMENTS

| 3,770,150 | A | * | 11/1973 | Clark ....................... 198/346.3 |
| 4,189,289 | A | | 2/1980 | Getman |
| 4,379,795 | A | | 4/1983 | Walser |
| 4,736,687 | A | * | 4/1988 | Grube et al. ............. 198/346.1 |
| 4,788,786 | A | * | 12/1988 | Suter ........................ 198/346.3 |
| 5,054,600 | A | * | 10/1991 | Blankemeyer et al. ... 198/346.3 |

FOREIGN PATENT DOCUMENTS

| DE | 197 06 175 | 8/1988 |
| EP | 0 039 515 | 11/1981 |
| GB | 2 015 862 | 9/1979 |
| GB | 2 204 775 | 11/1988 |

* cited by examiner

Primary Examiner—James R. Bidwell
(74) Attorney, Agent, or Firm—Dykema Gossett PLLC (57) ABSTRACT

The invention comprises a slat conveyor for handling ice cream products (6) which are immersed for some time in processing vessels. Each slat (9) in the conveyor consists of an upper part (33) supported at a fixed height in the frame (40) of the machine and a lower part (34) that may be lifted and lowered by means of a lifting beam (41). The lower part (34) of the slat is supported by individually coupling and uncoupling means (44, 48). The means (44) are connected with the lifting beam (41) and the means (48) are connected with the frame. By activating and deactivating the means (44, 48) together with the lifting beam (41) it is possible to keep the products (6) in a raised position or in a lowered position throughout one or more successive operations. Hereby the process period may easily be varied and the slat conveyor can readily be adapted to different products just by changing the programming of the control unit for the coupling means (44, 48) and the lifting beam (41).

10 Claims, 9 Drawing Sheets

FIG. 9

APPARATUS AND A METHOD FOR HANDLING CONFECTIONERY PRODUCTS

BACKGROUND OF THE INVENTION

The present invention concerns an apparatus for handling confectionery products which can be moved in rows through several successive processes in which the products may have different periods of stay, the apparatus comprising a slat conveyor arranged above a row of process stations and provided with means for individually lifting and lowering the conveyor support of the slats, which conveyor is arranged for stepwise carrying the rows of confectionery products through a number of working positions.

The invention also concerns a method for handling confectionery products carried in rows through several successive processes where the products can stay for different periods of time, where a slat conveyor arranged above a row of process stations is carried stepwise through a number of working positions.

In the first place, the present invention concerns handling of ice cream products. As the invention has been developed in connection with and is especially applied to ice cream products, it will be explained in the following with reference to problems and circumstances by apparatuses and methods for ice cream production. However, the invention can also be used in connection with other confectionery products or food products subjected to treatment by immersion into successive vessels.

In connection with the making of ice cream products, the hardened and frozen ice product is removed from a conveyor after passing a freezer tunnel. The ice cream product, whether an ice lolly, sandwich, bar, or cone, is then carried through a handling step where it is given a final or finishing treatment before it is conveyed to a packing unit.

The invention especially concerns the handling step disposed between the freezer tunnel and the packing unit.

It is known to dip the product once or several times in a mass, often chocolate, by lifting a so-called dip cup or dip vessel up to the ice product which is suspended from a conveyor.

Another known principle is to dip the ice product once or several times in stationary vessel, typically containing chocolate. This method may also be used for immersion into several successive vessels containing different products, for example water ice products and chocolate for final treatment of the ice cream product. Also, it is known to perform a subsequent dipping into several successive vessels, that alternately contain syrup and nitrogen. Hereby several layers of different or identical types of syrup are frozen onto the ice product. This principle differs in that it is a slat with the products which is lowered into the stationary vessel.

A common feature of the handling method is that the conveyor and thereby the ice products are conveyed stepwise. Thus a row of ice products is disposed transversely of the conveyor, the products suspended from a so-called slat. When the products are carried on sequentially they are either to perform a short or a long dip in the vessel between two conveying steps. A variation in the dipping of the product is only possible within very narrow limits. Furthermore, the known methods and apparatuses are disadvantageous as they require a very long time for readjustment. Thus the so-called elevators establishing the dipping consist of a rail segment inserted between a preceding and a subsequent rail segment in which the lateral edges of the conveyor is running. When the position of such an elevator is to be exchanged, it is necessary to read just the whole machine and to exchange the preceding and the subsequent guide rails within a single section of the machine.

Furthermore, the known systems are time-consuming to readjust if at the same time slats and/or fastening means have to be exchanged. If the conveyor is to be used for products requiring another kind of holding to a slat, it will also be necessary to exchange the slats. Until now this has been a labour-intensive and slow process. Thus it has been necessary to demount all of the slat conveyor and/or disassemble and assemble the single slats.

It is a purpose of the present invention to indicate a method and a plant implying great flexibility with respect to the number of dippings in each vessel or subsequent vessels, and which implies flexibility with regard to the type of dipping used while the dipping periods may be varied also, and which system at the same time makes possible a quick readjustment of the whole handling plant.

According to the present invention this is achieved with an apparatus of the kind mentioned in the introduction which is peculiar in that the slats via first coupling means capable of being activated individually and placed at each working position and which have first engagement means displaceable between a position of engaging the slat and a position of disengaging the slat, that there is provided second coupling means with second engagement means which are also capable of being individually activated between a position of engaging the slat and a position of disengaging the slat, and that the coupling means are connected with a central control unit activating the engagement means according to a predetermined sequence.

The method according to the invention is peculiar in that said lifting means support coupling means which are activated individually at each working position in order to make engagement means engage or disengage a slat according to signals from a control unit programmed with a predetermined processing sequence.

With an apparatus and a method according to the invention it becomes possible to omit the elevator. Instead there is provided a lifting beam at each side of the conveyor. At the lower run of the slat conveyor the lifting beam supports each slat so that it may individually be brought to a lifted or a lowered position. As the first and second engagement means are capable of being activated individually, it is possible to lift and lower a slat together with the lifting means and/or to let a slat stay hanging in a lifted position irrespective of the lifting and lowering of the lifting mean.

The coupling means preferably comprise cylinder, preferably pneumatic cylinders. However, alternatively there may be used hydraulic cylinders or electrically activated cylinders. Only it is important that the cylinders are connected with a central control unit establishing the desired working sequence for the individual cylinders. Attentively, pivoting coupling means may be used which can pivot into and out of engagement with the slats.

By activation of the cylinder, the engagement means in the shape of blocks, rollers, rails or the like are displaced into and out of engagement with the slat.

The lower part of each slat with preferably be provided with rollers supported by engagement means in the form of sections of support rails. These rails are provided side by side so that the rollers will be supported hereon for the displacing of the conveyor with the slats in a raised position. By pulling the support rails back, the slat will then rest on slide blocks placed at the underside of the slat. These slide blocks supported by the lifting beam makes it possible to lift and lower the lower part of the slat when the support rail is moved to a position without engagement of the rollers.

By activating and deactivating support rails and slide blocks, respectively, it will thus be possible optionally to determine whether an individual slat in the slat conveyor is to be lifted and lowered in one working position or whether this slat in one or more subsequent working positions is to be in a lifted or lowered position. Thus it becomes possible to make the processing time at a process station shorter or longer, and the product can stay in the dipping vessel at a process station through one or more working positions.

A readjustment of the apparatus between different processes will thus not require interfering mechanically. It is only necessary to put a new control program into the control unit. The cylinders used for activation of support rail and slide block, respectively, may be controlled by electronic or electrical readjustment of the cylinders as well as the readjustment also may take place by pneumatic or hydraulic signals.

An apparatus according to the invention will be a lot more flexible than the known apparatuses. The known plants will typically be arranged for a single or a few types of production processes because of the mechanical difficulties. Because of the great flexibility implying optional process time, an apparatus according to the invention will make it possible to readjust the apparatus to manufacture different kinds of products just by exchanging the program controlling the cylinders and possibly at the same time exchanging the process stations.

By the making of ice cream products, the process stations will typically comprise dipping vessels which may contain nitrogen, syrup, chocolate and/or other materials used for coating a product, or containers with materials for dry coating, as for example nuts, desiccated coconut, and the like. The process stations will then be provided in the shape of open vessels wherein the products are dipped. The dipping time can be made shorter or longer whereby it becomes possible to vary the thickness of the layer applied to the product.

A quick readjustment between different types of products is furthermore realised with an apparatus according to the invention where the lower part of the slat is attached releasably to an upper part of the slat. By providing spring loaded, pivotable hooks on the lower slat for engaging pins on a link connection between the upper and lower part of the slat an exchange of the lower part may be performed with a very quick action. Hereby the lower part of the slat with means for suspending products is exchanged without the use of tools and with a limited consumption of time.

DESCRIPTION OF THE DRAWINGS

The invention will now be explained more closely with reference to the accompanying drawing, wherein.

Figure 1:
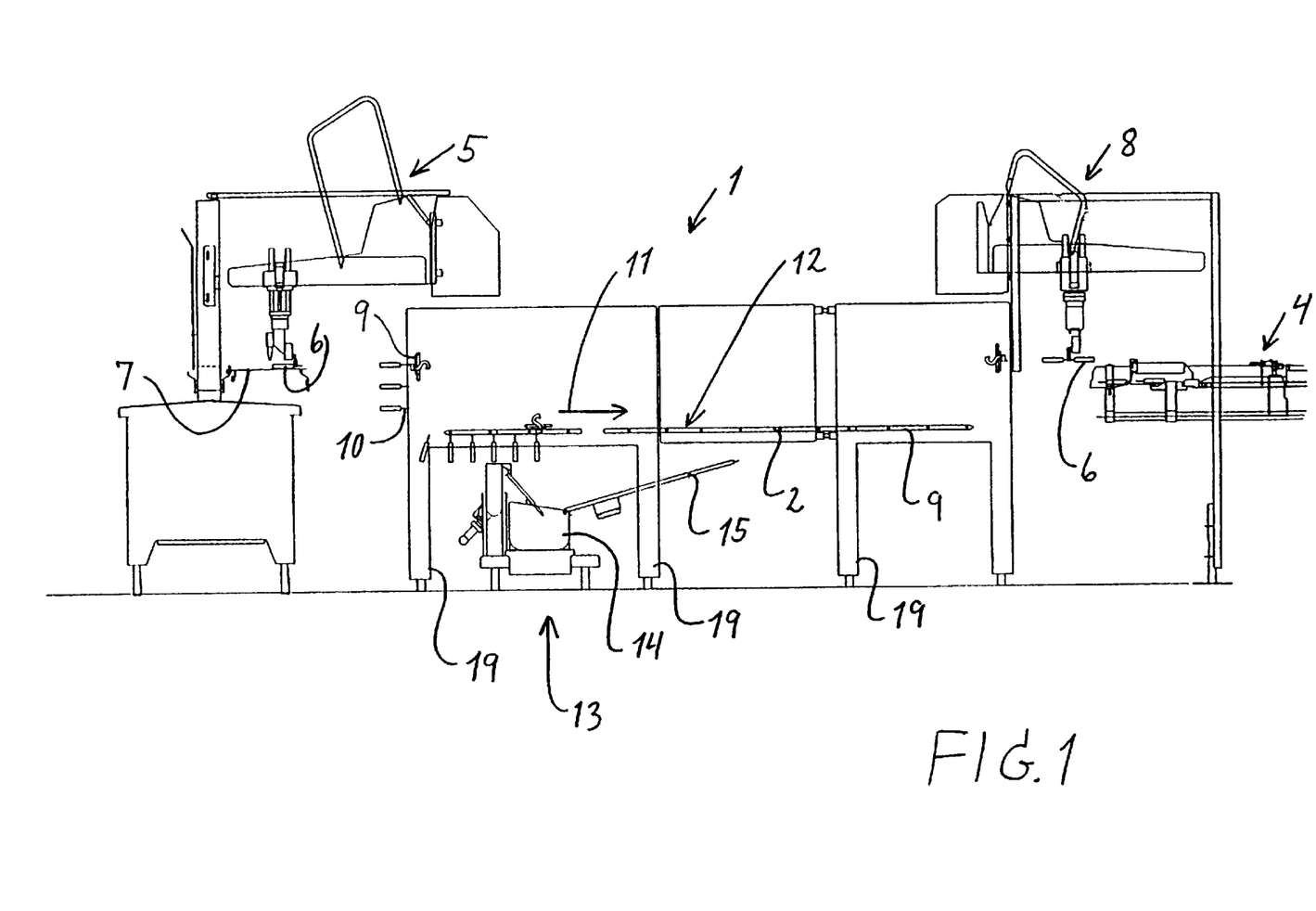
FIG. 1 is a view of a plant containing a known apparatus.

FIG. 1 illustrates a plant for making ice lollies. The plant comprises a process section 1 known per se with a slat conveyor 2. The process section 1 is disposed between a freezer tunnel 3 and a packing section 4. A robot 5 is used for transferring products 6 from trays 7 in a tray conveyor passing through the freezer tunnel 3 to the slat conveyor 2. Between the process section and the packing section there is provided a further robot 8 for transferring the treated products 6 from the slat conveyor to the packing section 4.

The products 6 are thus placed in rows in tongs juxtaposed in each slat 9. The shown example concerns ice lolly products gripped by the lolly 10. The slat conveyor is advanced stepwise in direction of arrow 11. Thus the products at a lower run 12 of the slat conveyor will be situated over a process station 13 comprising a dipping vessel 14. The products may be dipped in this vessel to provide, for example, a coating of chocolate. The product is then lifted up and carried along the lower run 12 of the conveyor. In addition, the process station comprises a dripping off section 15 where excess chocolate runs off and flows back into the vessel 14 when the products are moved through the process section 1.

The conveying speed and length of the slat conveyor is adapted so that the coating applied to the product is hardened when the products reach the robot 8. The products are thus ready to be transferred to the packing station and to be packed and then distributed.

The present invention concerns an apparatus used in the process section 1.

Figure 2:
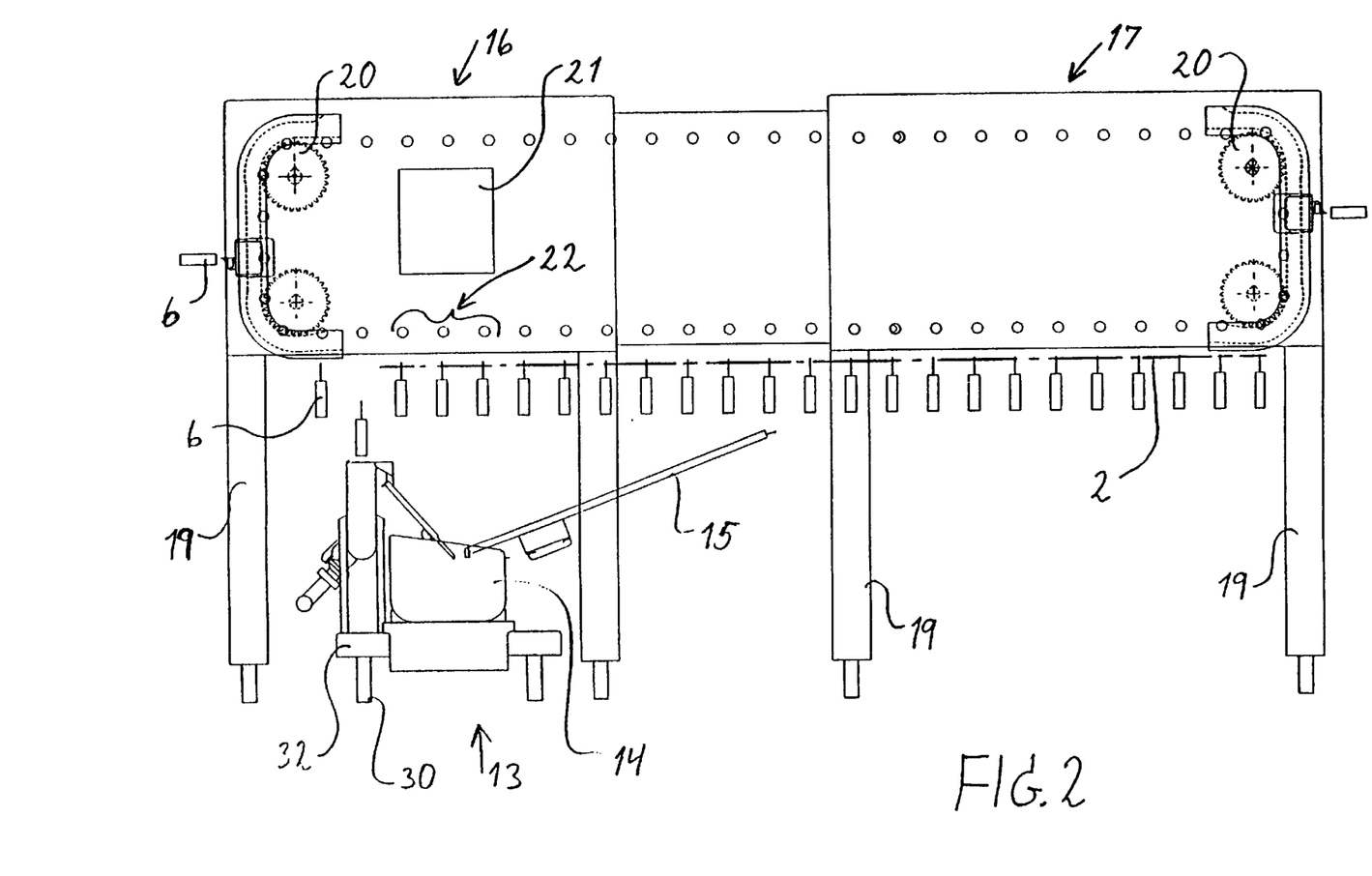
FIG. 2 is a side view of a first embodiment of an apparatus according to the invention.
Figure 3:
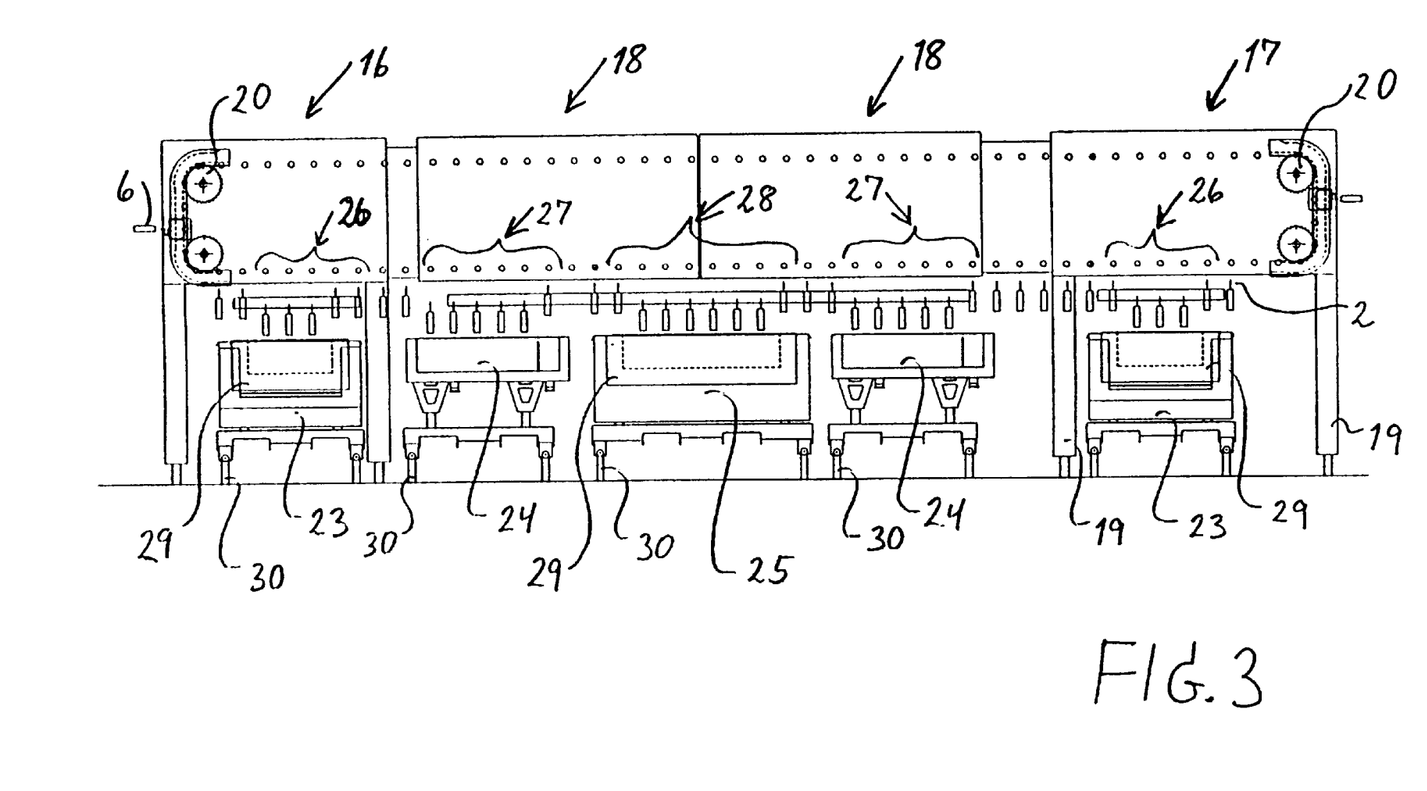
FIG. 3 is a view of a second embodiment of an apparatus according to the invention.
Figure 4:
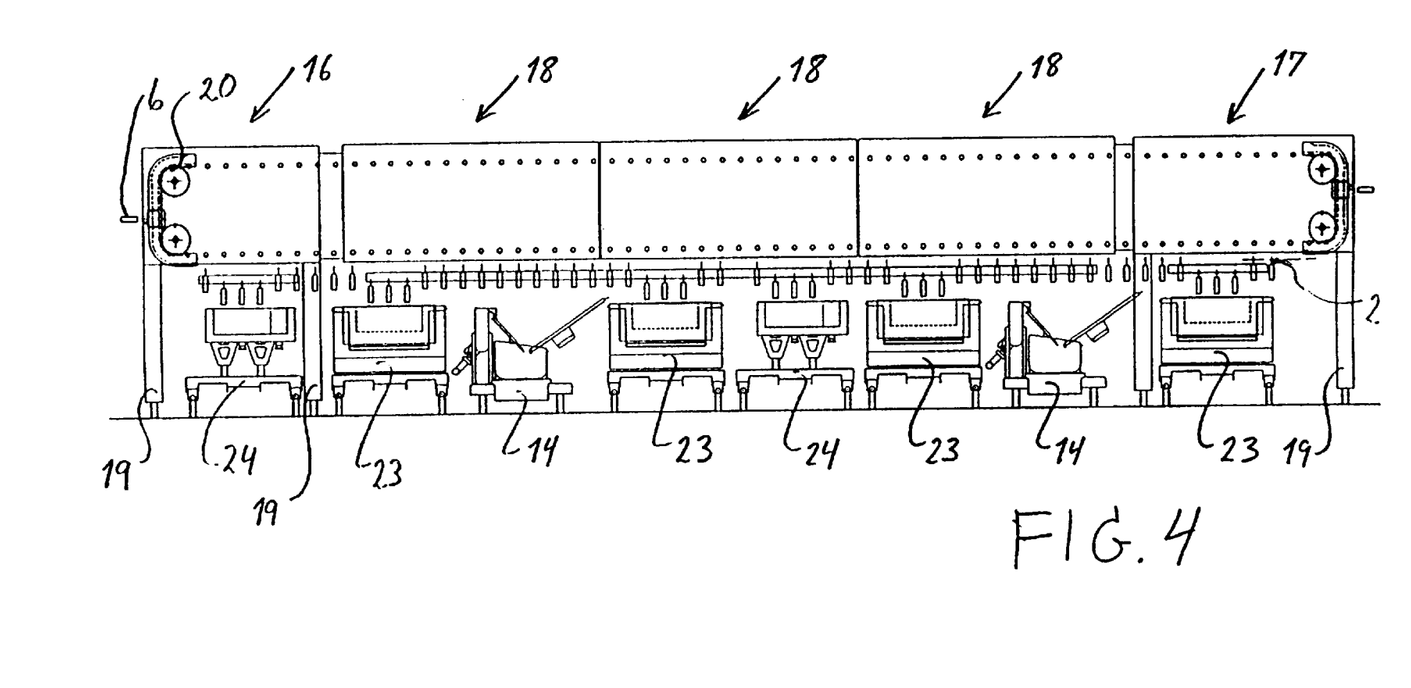
FIG. 4 is view of a third embodiment of an apparatus according to the invention.

In FIGS. 2–4 there are illustrated different embodiments of apparatuses according to the present invention. As identical or corresponding elements have been given the same reference, no detailed explanation of each embodiment will be given.

In each of the FIGS. 2–4 there is illustrated an apparatus constituting an process section that may be inserted between a freezer tunnel 3 and a packing station 4.

The apparatus comprises a slat conveyor 2 only schematically depicted in the FIGS. 2–4. The apparatus comprises a support for the slat conveyor together with a receiving station 16 and a removing station 17. Between these there may be a number of intermediate sections 18 having a greater or lesser length in order thereby to place large or small vessels 14 under the slat conveyor 2. The division of the apparatus into a number of sections 18 is necessary in practice, and in some cases very long slat conveyors will be supported by legs 19.

An apparatus according to the invention may in principle be built up with receiving station 16 and removing station 17 as illustrated in FIG. 2. These will be placed directly between a freezer tunnel 3 and a packing station 4. The slat conveyor 2 is driven by two drive wheels 20. Alternatively, only one drive wheel may be used if the slat conveyor 2 is relatively short.

In FIGS. 2–4 each product 6 illustrates a working position, i.e. a position where a slat 9 is standing still in its stepwise movement.

In FIG. 2 is shown a work station comprising a single dipping vessel 14 intended for applying chocolate coating.

In the shown embodiment the products 6 can optionally be placed in the dipping vessel 14 in any of the working positions 22 above the vessel 14. However, usually a chocolate coating will be applied by a quick dip in a single working position where the product is lowered down into the chocolate and lifted again before the next step of the movement of the slat conveyor.

In FIG. 3 is seen a row of process stations comprising different forms of immersion vessels 23, 24, and 25. These types of vessels can be used for alternative dipping into nitrogen in vessels 23 and 25 and dipping into syrup in vessels 24. By keeping the products immersed for a shorter or longer period of time in each vessel there is achieved a lighter or stronger freezing and a thinner or thicker layer, respectively, at the coating of the product. Above the vessel 23 there is a section 26 comprising five working positions. Over the vessels 24 there is a section 27 comprising seven working positions where the products 6 can be dipped. Over the vessel 25 there is a section 28 containing eight working positions where the products can be dipped.

It is seen that the vessels 23 and 25 are placed in an isolated frame 29 provided with wheels 30. The vessels are directly supported on frames 31 which are also provided with wheels. Likewise, the vessel 14 in FIG. 2 is placed on a frame 32 supported by wheels 30. Thus it is easy to remove a vessel and to substitute it with another vessel if a changed processing or coating of the products 6 is desired.

In FIG. 4 there is shown a further embodiment of the apparatus according to the invention. This apparatus is arranged with process stations corresponding to those described in connection with FIGS. 2 and 3. Thus the apparatus comprises a first vessel 24 for applying syrup or caramel mass. Subsequently there is disposed a vessel 23 with nitrogen for freezing the formed coating. Then the products are applied chocolate coating in the dipping vessel 14. Thereafter a further freezing is performed in the dipping vessel 23, and a further layer of syrup or caramel is applied in the dipping vessel 24. This coating is frozen in the nitrogen vessel 23. The product is finished with a chocolate coating in the dipping vessel 14 and freezing in the dipping vessel 23. The products 6 will then be ready for packing. As it appears from the above, the apparatus is constructed with a possibility of placing different process stations under the slat conveyor.

In the following, with reference to FIGS. 5, 8 and 9, there will be given a more detailed explanation of how the apparatus is arranged with the intention of lifting and lowering the slats 9 at each working position.

Figure 5:
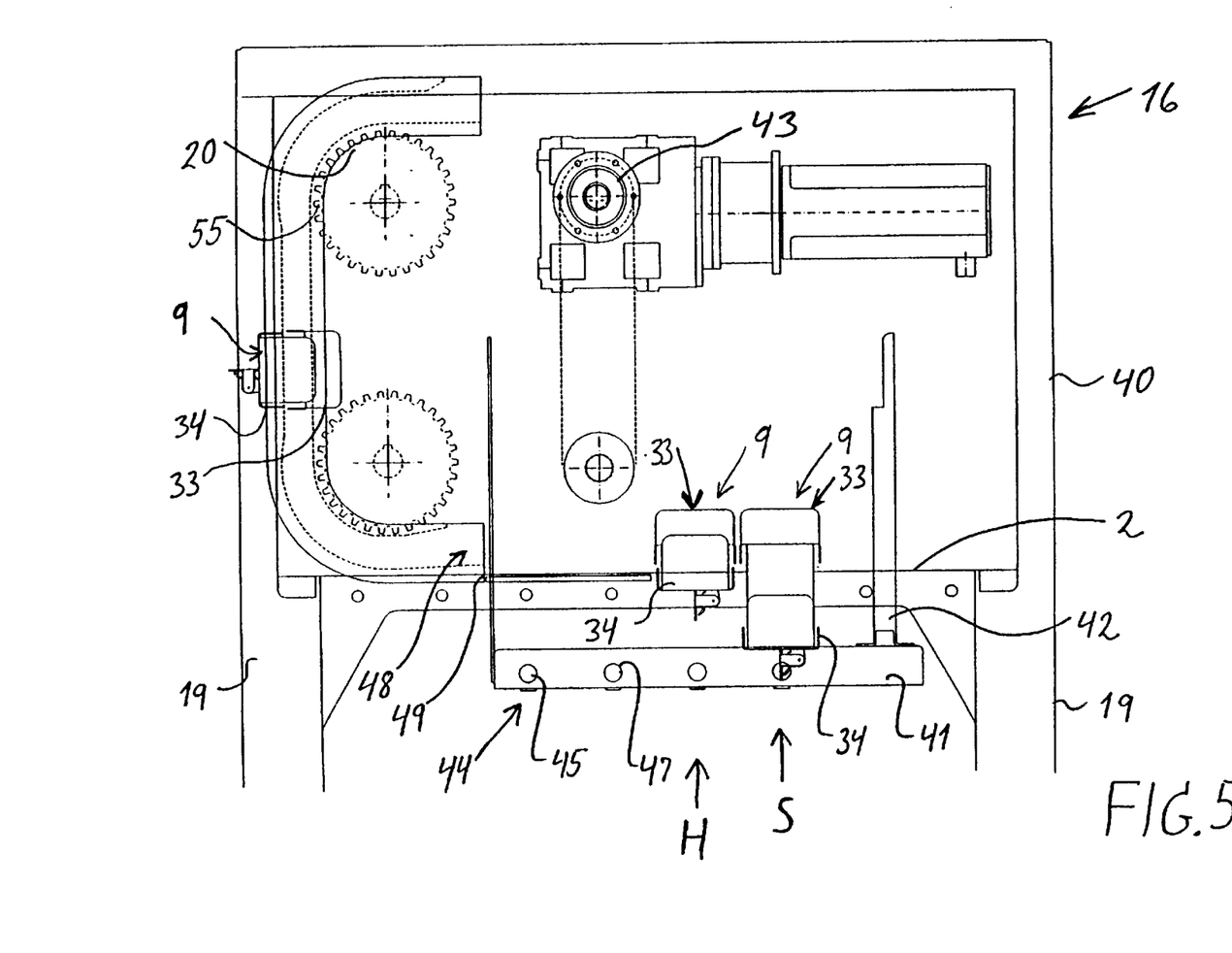
FIG. 5 is a partial view for illustrating details of an apparatus according to the invention.

FIG. 5 shows a side view corresponding to FIG. 2 of a receiving station 16. The slats 9 comprise an upper part 33 and a lower part 34. These are mutually connected by a link arrangement which at each side comprises two members 35,36 mutually connected with a hinge 37 and connected with the upper and lower part, respectively, via hinge connections 38,39. The upper part 33 is arranged to be supported at a fixed height relative to the apparatus frame 40 whereas the lower part 34 is arranged to be lifted and lowered. For lifting and lowering the lower part 34 there is used a lifting beam 41. The lifting beam 41 is via a spindle 42 connected with a spindle motor 43 for lifting and lowering one or more slats supported by the lifting beam 41 when the slat conveyor has stopped and the slats 9 are in a working position.

There is provided a lifting beam 41 at each end of the slats 9, and these lifting beams are driven by the same motor 43. As shown it will be suitable that the lifting beams 41 are lifted and lowered by means of spindles disposed in the frame 40 of the apparatus which by placing on the legs 19 create room for process vessels under the slat conveyor.

The lifting beam 41 supports the lower part 34 of the slat via first coupling means 44 comprising a cylinder 45 provided with a slide block 47 at the end of its piston 46 (see FIG. 7), the block 47 supporting the underside of the lower part 34 of the slat when the piston is in its extended position.

The lower part 34 of the slat is furthermore supported by coupling means 48 (see FIG. 7) firmly connected with the frame 40 of the apparatus. The coupling means 48 comprises a support rail 49 connected with a piston 50 placed in a cylinder 51 and which can be displaced between a position for engagement under a roller 52 at the end of the upper part 33 of the slat 9.

If the support rail 49 is engaging under the roller 52, the lower part 34 of the slat will stay in its raised position irrespective of the lowering of the lifting beam 41 as shown by working position H in FIG. 5. If the support rail 49 is pulled back from its engagement under the roller 52, the lower part 34 of the slat will be lowered together with the lifting beam 41 as illustrated by working position S in FIG. 5. When the lifting beam 41 and thereby the associated slats 9 are brought to a lowered position, the cylinder 45 may be activated so that the slide block 47 is pulled back from its engagement under the lower part 34. Thus the lower part 34 will stay in its lowered position when the lifting beam 41 is lifted afterwards. In this position the lower part 34 will become suspended from the upper part 33 via the two members 35,36.

The upper part 33 of the slat is supported on the frame via rollers 53 running on a rail (not shown) in the frame. Subsequent slats 9 are mutually connected by means of a chain link 54 which simultaneously is used for engaging teeth 55 on the driving wheel 20.

Figure 8:
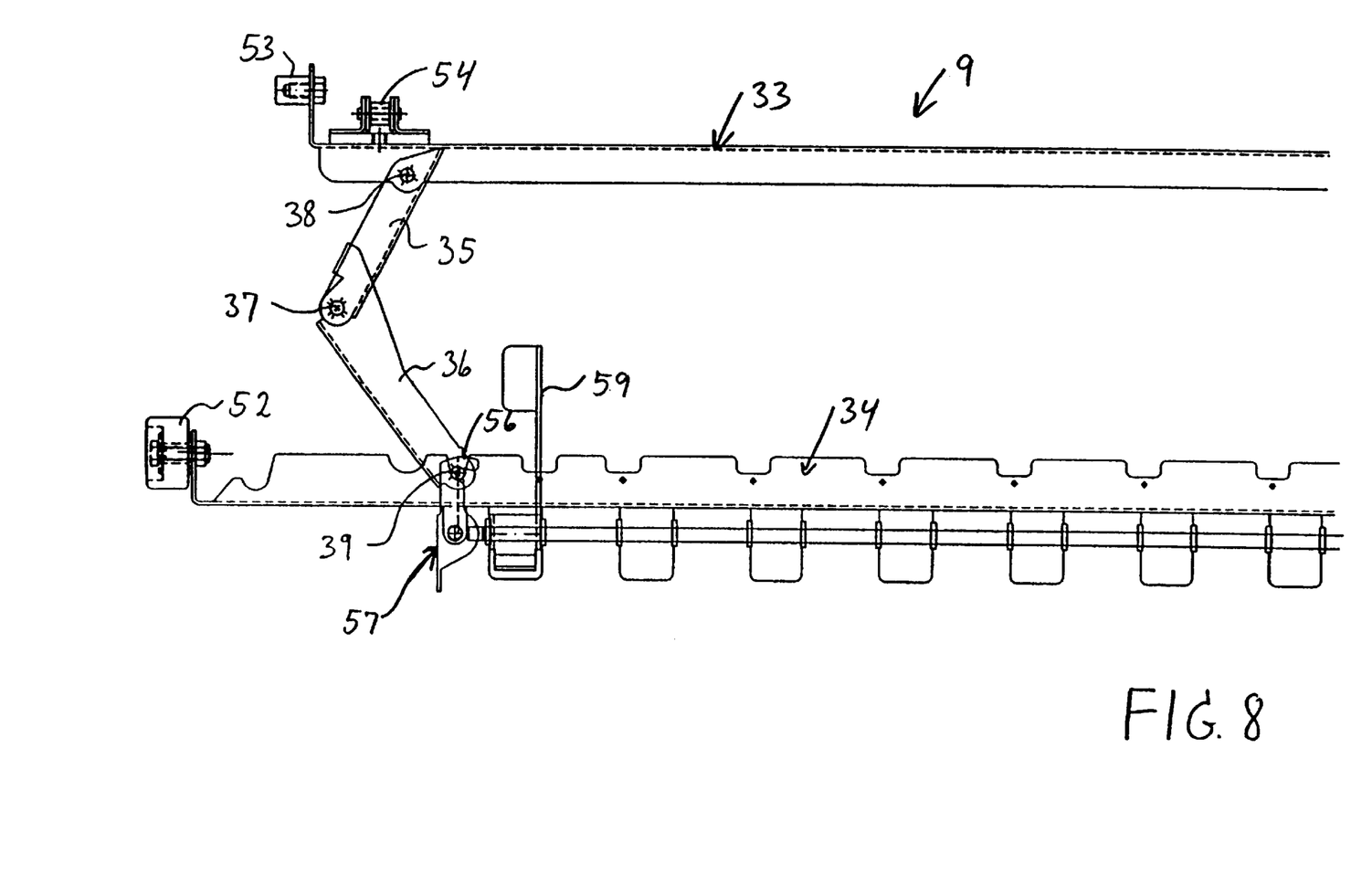
FIG. 8 is a partial side view of a slat forming a part of an apparatus according to the invention.

In FIG. 8 is shown a slat 9 in its lowered position with the lower part 34 suspended from the upper part 33 by the members 35,36 which are in their open position.

Figure 9:
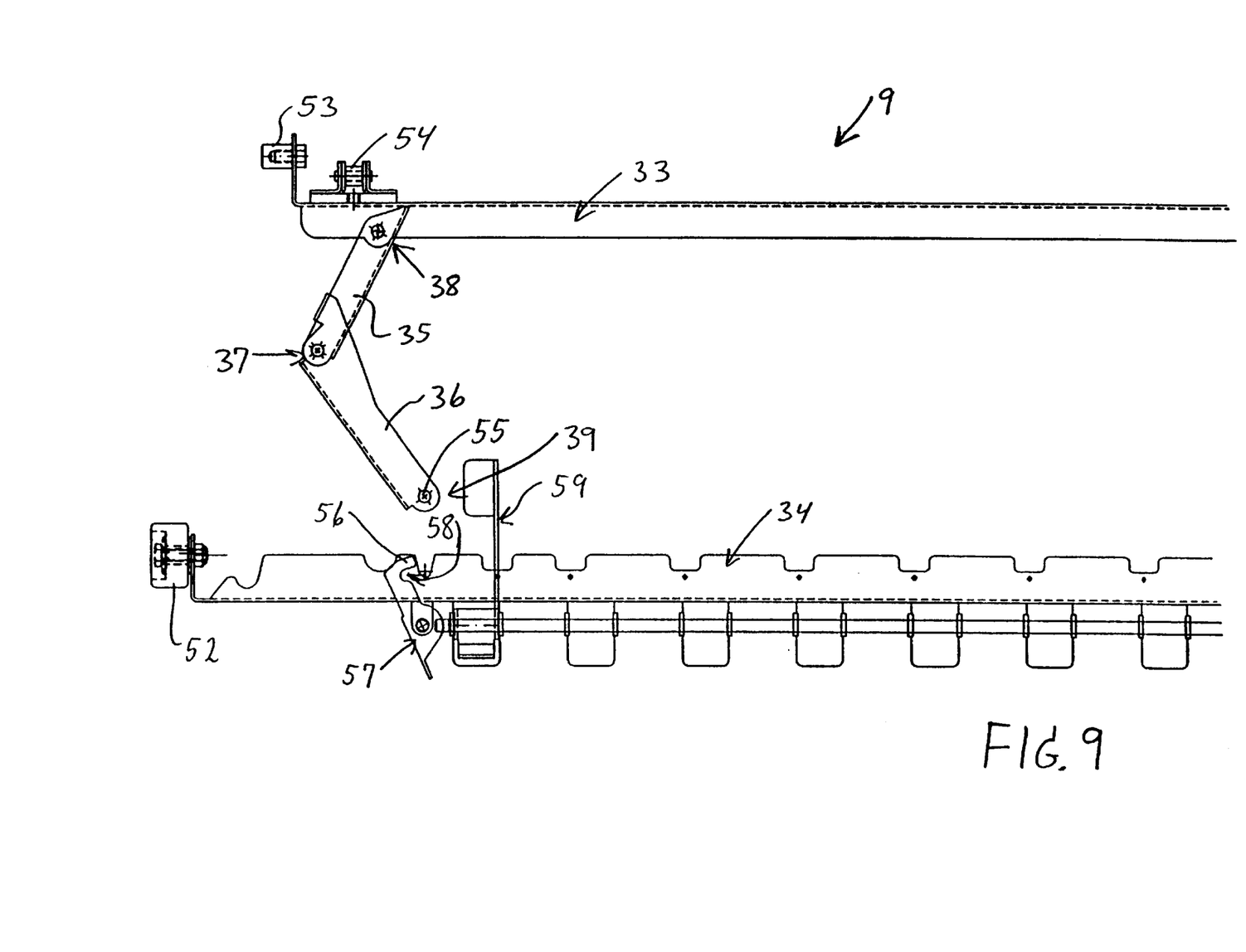
FIG. 9 shows a view corresponding to FIG. 8, but with the two parts of the slat separated.

From FIGS. 8 and 9 it is seen that the hinge 39 is formed by a pin 60 interacting with a hook 56 suspended pivotably by a hinge 57 on the lower part 34. The handle 57 provided with a hook is spring biased toward the locked position illustrated in FIG. 8. When exchanging the lower slat 34, the user can exert a force against the action of the spring and thereby release the pin 60 from its engagement with a notch 58 under the hook 56. Thus it is possible readily and quickly to exchange the lower slat part 34 without use of tools. This may be the case if the products to be treated are hanging in tongs different from the illustrated tongs 59. The tong 59 is known per se and intended for engaging a lolly 10 in an ice cream product. Alternative tools may be tongs intended for gripping the wafer in a wafer product or tongs for gripping sandwich products.

Each of the coupling means 44,48 and the motor 43 for the lifting beam 41 are connected with a central control unit. This connection may be established by wires for electric or electronic signals or wires for transmitting a pneumatic or hydraulic signal used for adjusting the pistons 46,50 in an activated or deactivated position and for starting/stopping the motor 43 for lifting or lowering the lifting beam 41. The central control unit and wire connections are omitted for reasons of clarity of the drawing.

A method according to the invention will be explained below with reference to FIGS. 6 and 7.

Figure 6:
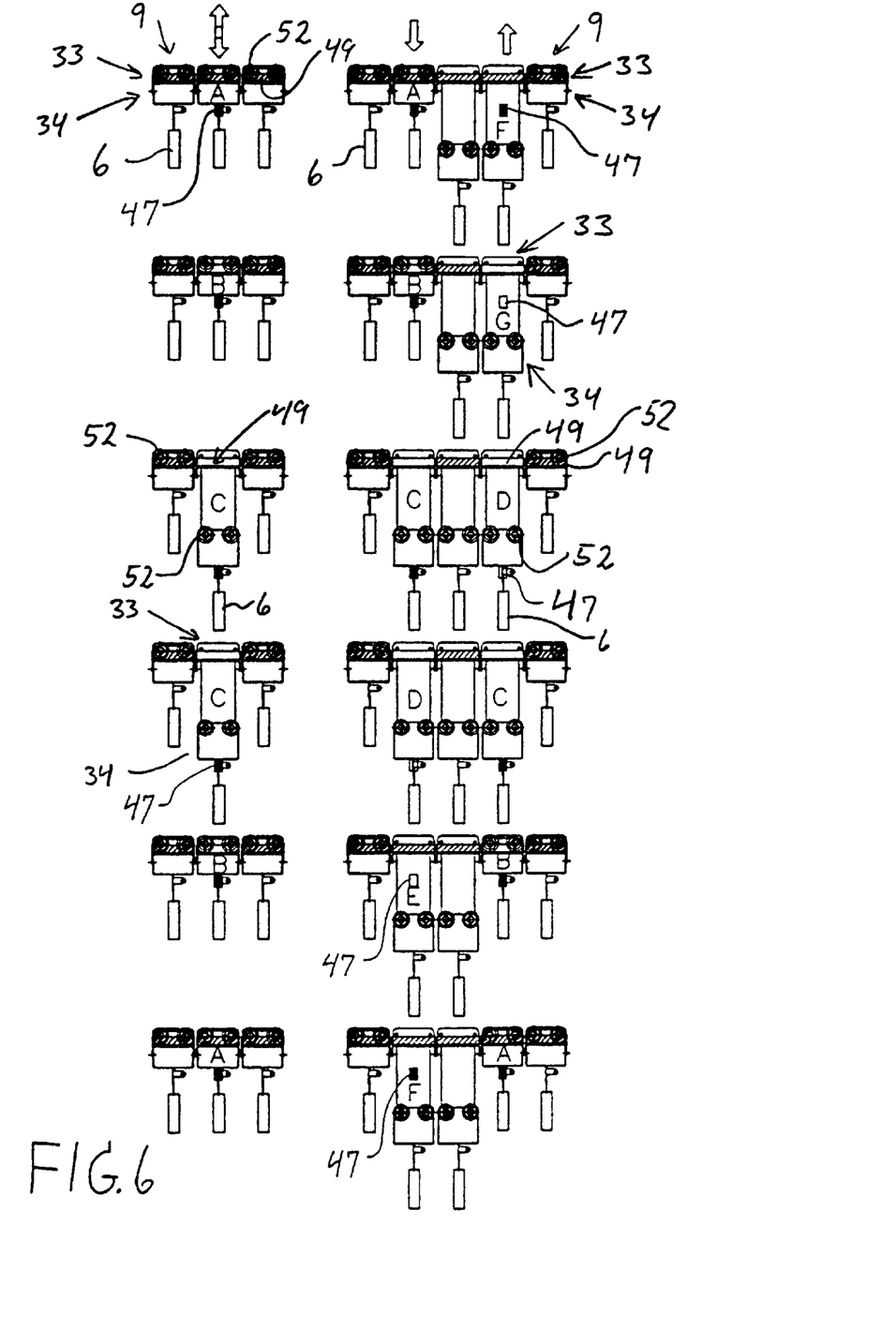
FIG. 6 shows partial, partly sectional views for illustrating a method according the invention.

In FIG. 6, hatching of support rail 49 and slide block 47, respectively, indicates that it is engaging under the roller 52 and the lower part 34, respectively. Missing hatching of support rail/slide block means that the element has been withdrawn from its engagement.

In FIG. 6 at the left there is illustrated a work sequence for dipping a product and a subsequent lifting up of the product in one and the same working position. In step A both coupling means 44, 48 are activated, and the support rail 49 is engaging under the roller 52, and the slide block 47 is engaging under the lower 34. Therefore the products 6 are situated in a raised position above a dipping vessel. In a subsequent step B the coupling means 48 is deactivated whereby the support rail 49 is pulled back from the engagement with the roller 52. When the lifting beam 41 then in the subsequent step C is lowered, the lower part 34 of the slat is lowered together with the lifting beam 41. After a short immersion, the lower part 34 of the slat is then carried up again by lifting the lifting beam 41 in the subsequent step as indicated with B. As the last step in this process, the coupling means 48 is activated again so that the support rail 49 is moved under the roller 52. The slat conveyor 2 is then ready for stepwise advancing where a subsequent slat 9 is brought to the actual working position where a short immersion takes place.

In connection with lifting the lower part 34 of the slat, in practice there will occur a lifting with the lifting beam 41 so that the roller 52 is situated at a short distance above the support rail 49 when this is displaced to its engagement position. Only after that the lower part of the slat is lowered a short distance for bringing the roller 52 to rest on the upper side of the support rail 49.

Figure 7:
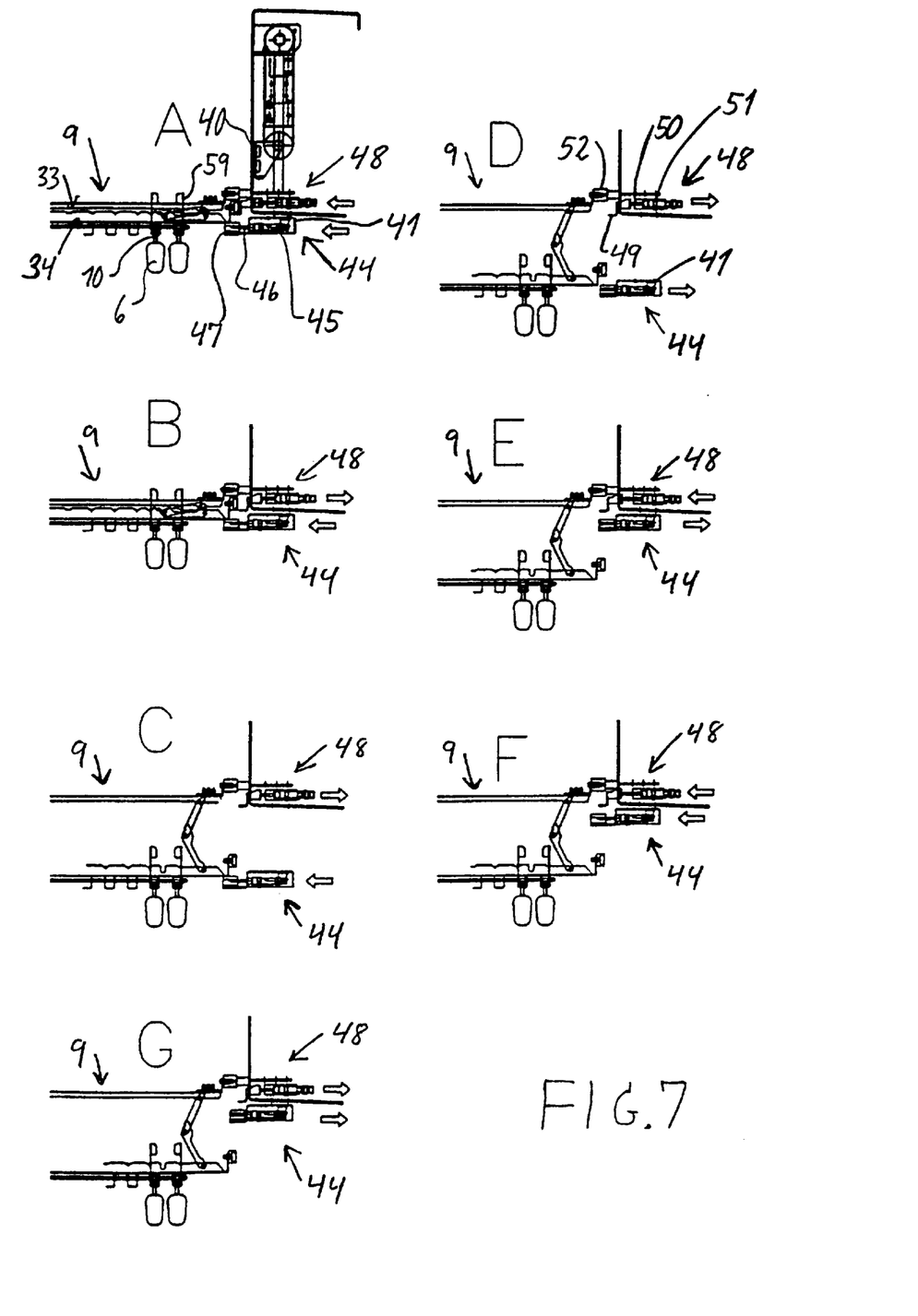
FIG. 7 shows partial side views for illustrating the same method steps as shown in FIG. 6.

In the right side of FIG. 6 there is illustrated a second working sequence where the single steps correspond to the working steps illustrated in FIG. 7.

There is illustrated a situation where lower part 34 is moved down in one working position and stays in this lower position by the three following working positions. In step A both the support rail 49 and the slide block 47 are engaging. In the subsequent step B the support rail 49 is drawn back. In step C the lower part 34 of the slat is lowered together with lifting beam 41. In step D the slide block 47 is drawn back from its engagement under the lower part 34 of the slat. Then the lifting beam 41 is lifted while lower part 34 stays in this lowered position at the next two stepwise advances of the slat conveyor. When the slat in question is in its new working position, the lifting beam 41 is lowered while the slide block 47 is back in its retracted position.

When the lifting beam then is in its lowered position, the slide block 47 is displaced under the lower part 34 of the slat. Hereafter it is again lifted to a raised position whereafter the support rail 49 is displaced under the roller 52. Then the slat conveyor is ready for a following stepwise conveying.

As it appears from the above explanation to FIGS. 6 and 7, lifting and lowering of an arbitrary slat 9 may take place at any working position provided with coupling means 44,48. It also appears that the advancing of the slat conveyor will occur with the lifting beam 41 in a raised position. The lifting beam 41 can be brought to its raised position irrespective whether one or more slats 9 situated opposite to the beam are in a raised or a lowered condition.

What is claimed is:
1. An apparatus for handling confectionery products which can be moved in rows through several successive processes in which the products may have different periods of stay, the apparatus comprising a slat conveyor arranged above a row of process stations and provided with means for individually lifting and lowering the conveyor slats, which conveyor is arranged for stepwise carrying the rows of confectionery products, through a number of working positions, wherein at each side of the conveyor there is provided lifting means supporting the slats, wherein the support of the slats are effected via first coupling means capable of being activated individually and placed at each working position and which have first engagement means displaceable between a position of engaging the slat and a position of disengaging the slat, there is provided second coupling means with second engagement means which are also capable of being individually activated between a position of engaging the slat, and the coupling means being connected with a central control unit activating the engagement means according to a predetermined sequence.

2. An apparatus according to claim 1, wherein the coupling means comprise a cylinder fastened to the lifting beam and the frame of the apparatus, respectively, and having a displaceable piston rod therein with the engagement means disposed at the free end of the piston rod.

3. An apparatus according to claim 1, wherein each slat is in two parts, an upper part supported at a fixed level in the frame of the apparatus and a lower part supported by the engagement means.

4. An apparatus according to claim 1, wherein the engagement means comprise a slide block supporting the underside of the lower part of the slat and a support rail supporting a roller at the end of the lower part of the slat.

5. An apparatus according to claim 4, wherein the slide block and the support rail are connected with each their cylinder and that these cylinders can be activated individually.

6. An apparatus according to claim 3, wherein the upper and the lower parts of the slat are mutually connected at each end via a link arrangement comprising two mutually hinged members that are hinge connected to the upper and lower parts of the slat and which in a lowered position are arranged to place the products in a process station.

7. An apparatus according to claim 3, wherein the upper and lower parts are mutually connected by means of a spring loaded hook attached to one slat part and being pivotable between a locked and an open position in relation to a lock pin on the other slat part.

8. A method for handling confectionery products carried in rows through several successive processes where the products can stay for different periods of time, where a slat conveyor arranged above a row of process stations is carried stepwise through a number of working positions, as the slats are supported by lifting means at each side of the conveyor, comprising the steps of supporting coupling means by said lifting means, activating said coupling means individually at each said working position in order to make engagement means engage or disengage a slat according to signals from a control unit programmed with a predetermined processing sequence.

9. A method according to claim 8, comprising the further step of optionally bringing each slat to a lifted or lowered position at least one successive working position during the stepwise movement of the conveyor.

10. A method according to claim 8, wherein the coupling means comprise electronically controlled cylinder/piston units.

* * * * *